United States Patent [19]
Kaminer et al.

[11] Patent Number: 5,351,308
[45] Date of Patent: Sep. 27, 1994

[54] METHOD AND APPARATUS FOR MEASURING CRIMP FREQUENCY OF A WEB

[75] Inventors: Jon J. Kaminer, Richmond, Va.; Gary F. Nevers, Lynn, Mass.; Edgar V. Sellers, Wilmington, N.C.

[73] Assignee: E. I. Du Pont de Nemours and Company, Wilmington, Del.

[21] Appl. No.: 163,383

[22] Filed: Dec. 6, 1993

Related U.S. Application Data

[63] Continuation of Ser. No. 729,548, Jul. 15, 1991, abandoned, which is a continuation-in-part of Ser. No. 552,548, Jul. 16, 1990, abandoned.

[51] Int. Cl.$^5$ ............................................. G06K 9/00
[52] U.S. Cl. .................................. 382/8; 348/88; 250/559; 356/430
[58] Field of Search ............... 382/8, 22, 28; 356/237, 356/238, 429, 430; 250/559, 571, 572; 348/88, 125, 132; H04N 7/00, 7/18

[56] References Cited

U.S. PATENT DOCUMENTS

| | | | |
|---|---|---|---|
| 4,057,350 | 11/1977 | Craig | 356/199 |
| 4,232,336 | 11/1980 | Henry | 358/106 |
| 4,240,110 | 12/1980 | Henry | 358/107 |
| 4,270,252 | 6/1981 | Harrison et al. | 28/250 |
| 4,274,746 | 6/1981 | Cardell et al. | 356/429 |
| 4,415,926 | 11/1983 | Henry | 358/107 |
| 4,460,921 | 7/1984 | Henry et al. | 358/107 |
| 4,550,377 | 10/1985 | Craemer | 364/471 |
| 4,617,682 | 10/1986 | Mori et al. | 382/28 |
| 4,737,846 | 4/1988 | Tokuno et al. | 358/106 |
| 4,764,969 | 8/1988 | Ohtombe et al. | 382/8 |
| 4,807,143 | 2/1989 | Matsuura | 364/468 |
| 4,857,749 | 8/1989 | McCarty | 250/571 |
| 4,878,114 | 10/1989 | Huynh et al. | 358/106 |
| 4,887,155 | 12/1989 | Massen | 358/107 |

FOREIGN PATENT DOCUMENTS 50-18099 6/1975 Japan.

*Primary Examiner*—David K. Moore
*Assistant Examiner*—Andrew W. Johns

[57] ABSTRACT

A method and apparatus to non-destructively inspect and quantify yarn crimp characteristics either off-line or on-line at speeds in excess of 2,000 yds./min. by acquiring images of yarn crimp on-line during the manufacturing process, then digitizing the images of yarn crimp and performing all data processing from the digital data required. Each image is segregated into features (e.g. valid crimp, low frequency oscillations, high frequency oscillations, edge oscillations, and unconfirmed oscillations with each parameter being analyzed separately. Features are segmented two dimensionally using techniques such as, but not limited to, local max/min intensity profiles and spatial intensity and frequency thresholding. Regions identified as abnormal are separated from areas of valid crimp before determining crimp frequency. Outputs of individual analysis are combined to determine global tow quality. This method provides a complete statistical analysis for each lane in the tow as well as the overall tow width. Software analysis allows operator interaction if desired.

2 Claims, 10 Drawing Sheets

METHOD AND APPARATUS FOR MEASURING CRIMP FREQUENCY OF A WEB

This is a continuation of application Ser. No. 07/729,548 filed Jul. 15, 1991, now abandoned, which is a continuation-in-part of application Ser. No. 07/552,548 filed Jul. 16, 1990.

BACKGROUND OF THE INVENTION

The present invention relates to a method and apparatus for measuring crimp in a web of crimped tow and, more particularly, it relates to such method and apparatus for quantifying the crimp of a moving crimped tow.

Crimp is the waviness of a fiber which imparts a gross waviness to the tow form of fibers. Crimp is a key factor in the processibility of many staple products and for others is important because of the bulked property it induces in the finished fiber.

The amount of crimp in a given yarn sample may be expressed as crimps per unit length. A visual crimp count can be made by counting crimps in a unit length of tow using a calibrated reticle. This method involves sampling and is limited to off-line use.

It is also known in the art to determine crimp level in fibrous tow using a light source arranged at an angle to the tow such that any reflected ray of light reflects onto a light sensing means and to make a crimp count by measuring reflected light intensity.

Existing systems convert video images into slow scan signals, remove video synchronization and use conventional analog circuits for analysis. They look at high frequency crimp on low frequency background and then amplify and convert the signals into square waves using digital comparator circuits. The frequency of the square wave and duty cycle define crimp frequency and crimp angle. These existing systems do not, however, have the ability to adequately filter out data from areas of the image with such poor contrast that peaks are missed and thus incorrect wavelengths are reported.

SUMMARY OF THE INVENTION

The present invention obtains a standard video image of a web at known lane locations and converts the image into digital signals and performs all signal processing explicitly from the digital data using specific software algorithms to direct the signal processing. Each image is segregated into features, for example, base crimp, low frequency oscillations, high frequency oscillations, edge oscillations and unconfirmed oscillations, with each feature being analyzed separately. Features are segmented two dimensionally using techniques such as local maximum/minimum intensity profiles, spatial intensity and frequency thresholding and heuristics to enhance the video image without application of analog "filters". Regions identified as abnormal (e.g. poor contrast) are separated from areas where the base crimp level is easy to see before determining the crimp frequency distribution for the entire image of the web. A complete analysis of discrete lanes in the web image as well as the overall web width is prepared. Software analysis allows operator interaction if desired. Furthermore, it is desirable to eliminate certain types of crimping defects from the image before calculating the base crimp level, since the crimper settings that must be changed to adjust the base crimp level may be different than those settings which affect defects. The presence of defects leads to a distribution of crimp frequencies about the base crimp frequency.

Existing systems do not, however, have the ability to select and remove data from areas of the image with such poor contrast that peaks are missed and thus incorrect wavelengths are reported.

More particularly, the invention involves an inspection system for characterizing crimp features in a web of crimped fibrous materials comprising: electro-optic means responsive to variations in reflected light intensity from said web for obtaining a two-dimensional image of said web, said electro-optic means comprising means for digitizing and storing said two-dimensional image in a computer; means for measuring the location and the frequency of spatial variations in reflected light intensity in said two-dimensional image; means for classifying said stored locations and frequency of spatial variation in reflected light intensity into categories of base crimp, low frequency oscillations, high frequency oscillations, edge oscillations and unconfirmed oscillations; means for processing sequentially two-dimensional images of said web to classify the full width of the web into said categories of base crimp, low frequency oscillations, high frequency oscillations, edge oscillations and unconfirmed oscillations; and means for displaying said categories of spatial frequency of reflected light intensity within each image.

The method of the invention comprises viewing the web and generating electrical output signals representative of different appearance features of the web and discriminating said output signals to form signals representing extracted viewed features by obtaining a two-dimensional reflected light image of said web; digitizing and storing said two-dimensional image in a computer; measuring and storing the location and the frequency of spatial variations in reflected light intensity in said two-dimensional image; classifying said stored locations and frequency of spatial variation in reflected light intensity into categories of base crimp, low frequency oscillations, high frequency oscillations, edge oscillations and unconfirmed oscillations; processing sequentially, two-dimensional images of said web to classify the full width of the web into said categories of base crimp, low frequency oscillations, high frequency oscillations, edge oscillations and unconfirmed oscillations; and displaying said categories of spatial frequency of reflected light intensity within each image, wherein Base crimp (also referred to as valid crimp) is the crimp that would exist if no defects were present and is related numerically to the intended crimp level for the process, as illustrated in FIG. 4b.

Low frequency oscillation are oscillations in light intensity with frequencies appreciably lower than those intended for the process caused either by a crimping defect or by poor image quality, as illustrated in FIG. 4c.

High frequency oscillation are oscillations in light intensity with frequencies appreciably higher than those intended for the process caused either by crimping defects or by poor image quality, as illustrated in FIG. 4d.

Edge oscillations are oscillations in light intensity that extend to the edge of the captured image, and whose true frequency cannot be reliably estimated since part of the oscillation may extend beyond the edge of the image, as illustrated in FIG. 4e.

Unconfirmed oscillations are oscillations in light intensity that have a frequency expected for a base crimp or high frequency oscillation, but which failed to be confirmed by the adjacency test described below (page 12). Unconfirmed oscillations are illustrated in FIG. 4f.

The advantages of this method and system in measuring crimp are as follows:

1. Acquires non-distorted images of yarn crimp in 1/30th of a second at line speeds up to 2000 yds./min.
2. Completely processes acquired image in less than 3 seconds.
3. Segments image into regions containing: (a) valid crimp, (b) low frequency oscillations, (c) high frequency oscillations, (d) edge oscillations, and (e) unconfirmed oscillations.
4. Keeps track of population densities of various regions listed above.
5. Constantly analyzes all parameters within a lane and across all lanes in order to detect imperfections in the manufacturing process.
6. Incorporates user defined rules for determining levels of crimp and crimp imperfections, allowing the operator to be alerted to the need for corrective action. The information concerning crimp level and imperfections could also be fed directly into a closed loop control system if desired.
7. Automatically adjusts crimp analysis algorithms for optimal performance on a wide range of materials regardless of crimp amplitude, web reflectivity, or illumination level.
8. Simulated images of the web are generated to describe the imperfections to the operator.

DETAILED DESCRIPTION OF THE PREFERRED EMBODIMENT

Figure 1:
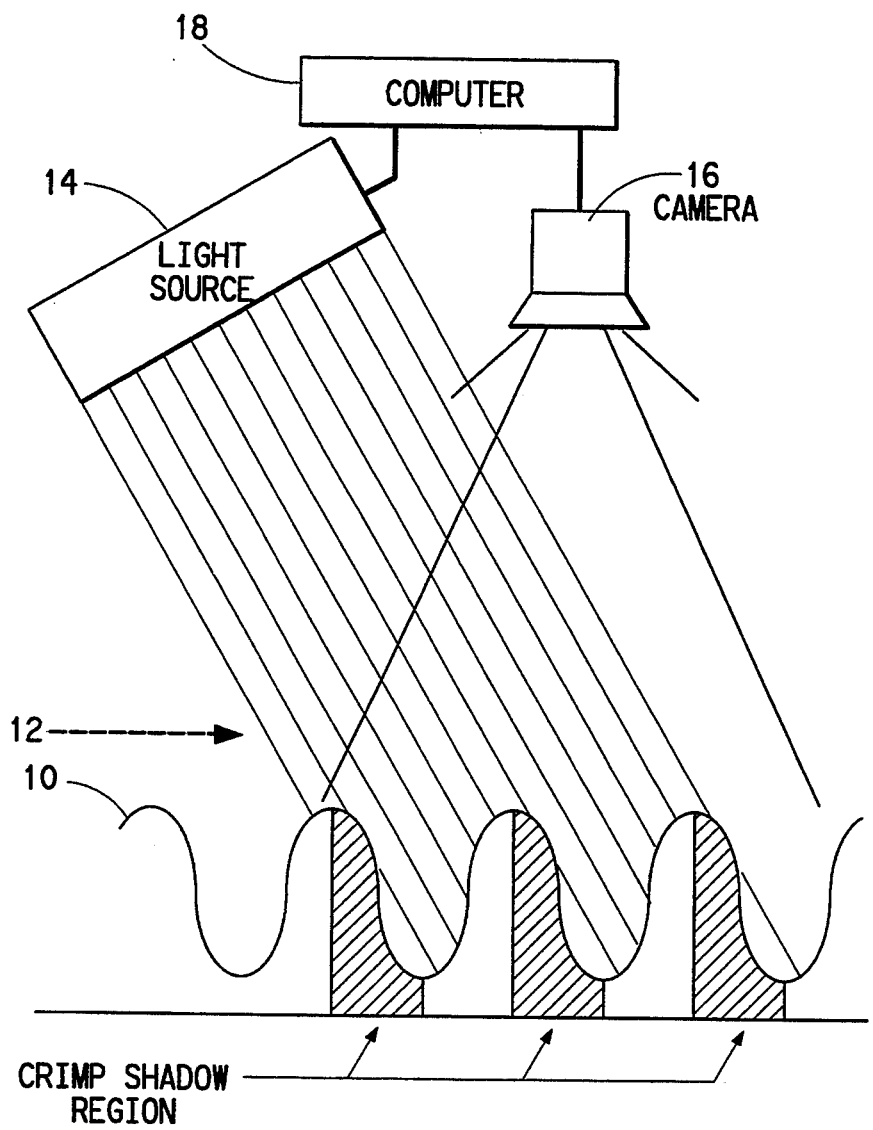
FIG. 1 is a schematic illustration of the basic optical system.
Figure 1A:
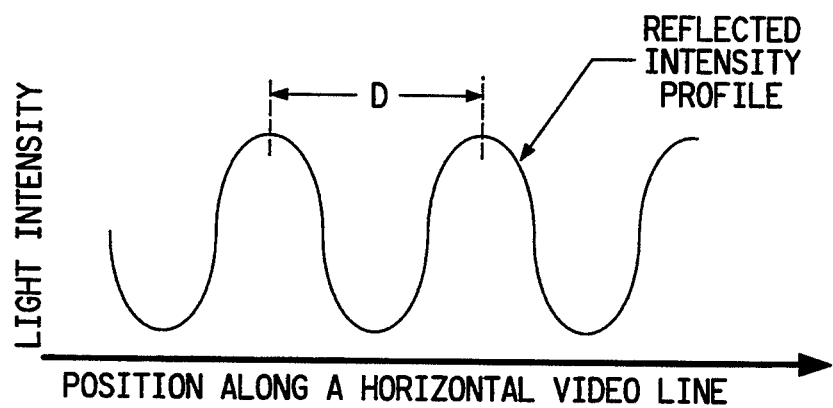
FIG. 1a is a graphic illustration of the reflected light intensity pofile view in FIG. 1.
Figure 2:
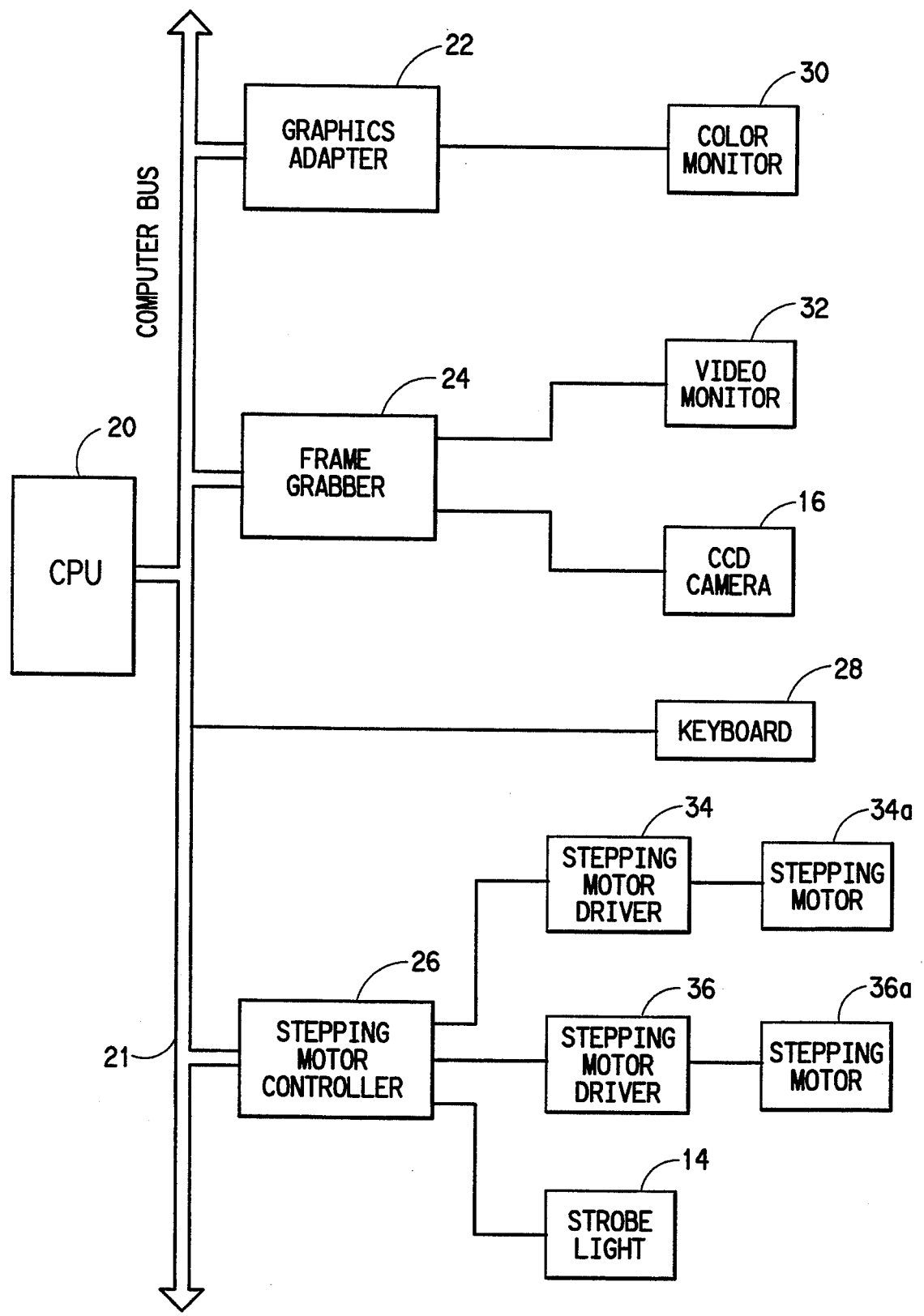
FIG. 2 is a schematic block diagram of the apparatus used in practicing the invention.

Referring now to FIGS. 1, 1a and 2, the embodiment chosen for purposes of illustration includes a web 10 moving in the direction of the movement arrow 12, a basic optical system that includes a stroboscopic light source 14 directed onto web 10 and a charge coupled device (CCD) camera 16 viewing the illuminated portion of the web. The CCD camera and the stroboscopic light are connected to a computer 18. The computer includes a central processing unit (CPU) 20 that is connected by a bus 21 to a VGA graphics adapter 22, a frame grabber 24, a stepping motor controller 26 and a keyboard 28. The graphics adapter 22 is connected to a color monitor 30 while the frame grabber interfaces with a video monitor 32 and the CCD camera 16. The stepping motor controller interfaces with the light source 14 and stepping motor drivers 34, 36 which in turn connected to stepping motors 34a and 36a, respectively.

The generic name and vendor identification of the equipment elements referred to above are as follows:

| Element No. | Description | Vendor Identification |
|---|---|---|
| 14 | High intensity light source and strobe light | APC No. 66-0003 and No. 66-0010 |
| 16 | CCD camera | Pulnix TM-540 |
| 20 | CPU | Amdex RPC-85 Industrial |
| 22 | VGA graphics adapter | |
| 24 | Frame grabber | Imaging Technology FG-100AT |
| 26 | Stepping motor controller | APC No. 66-009 |
| 28 | Keyboard | Amdex No. 80-2012 |
| 30 | VGA color monitor | |
| 32 | Video monitor | Panasonic WV-5140 |
| 34, 36 | Stepping motor driver | Superior Electric TH-230 |
| 34a, 36a | Stepping motor | Superior Electric MO-62 |

In operation, the active area of the CCD camera 16 is a mosaic array of pixels with 480 horizontal lines and 512 pixels per line. The basic optical system acquires an image of yarn crimp while the yarn is moving and the stroboscopic system allows an apparent stopped motion view. The crimp oscillations propagate horizontally within the acquired image giving a series of light and dark bars. Examination of a single horizontal line from the CCD camera would appear as in FIG. 1a an approximate sinusoidal function where the y-axis represents light intensity.

A basic preprocessing algorithm is applied to the spatial relationship between local maxima and minima in intensity for the series of dark and light bars.

Figure 3A:
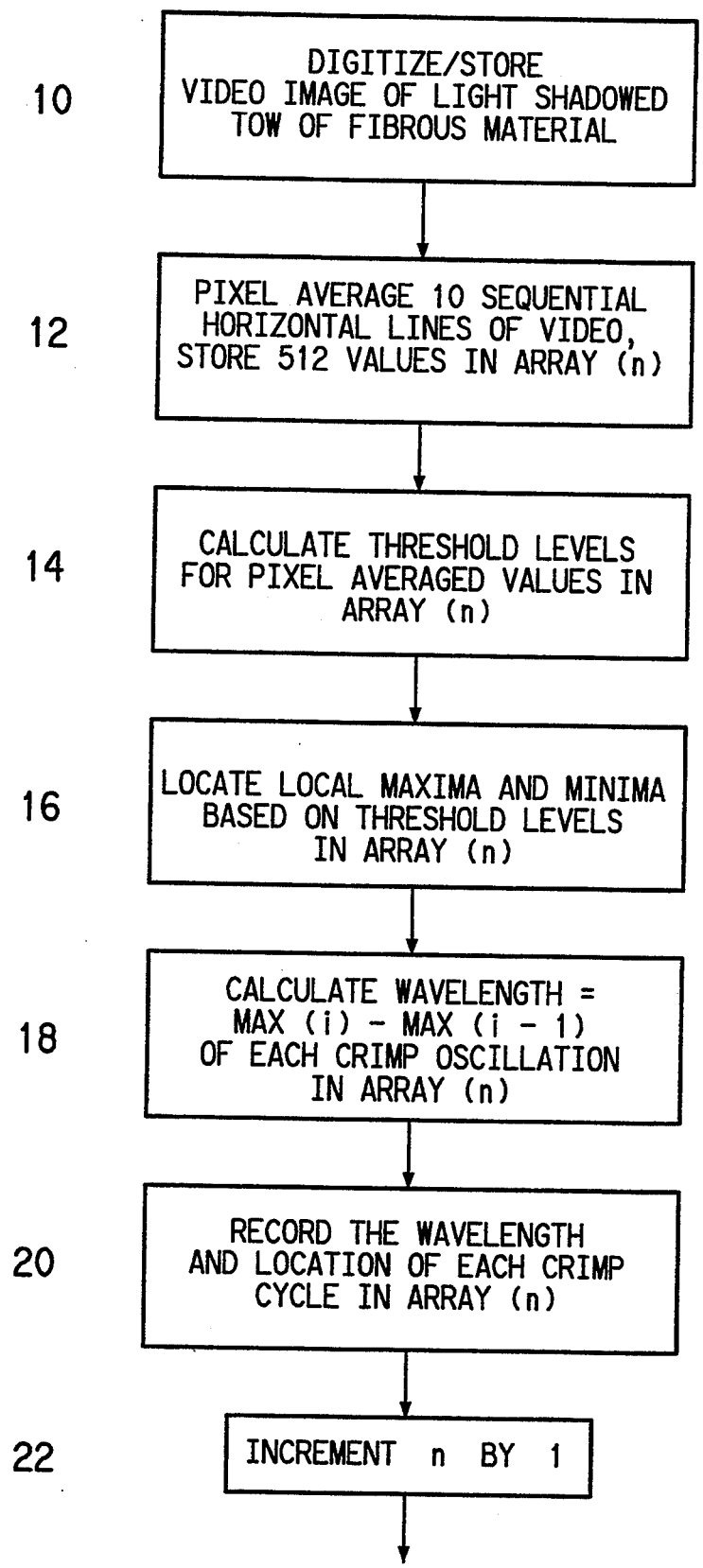
FIGS. 3a and 3b are flow diagrams of the algorithm used in practicing the invention.
Figure 3B:
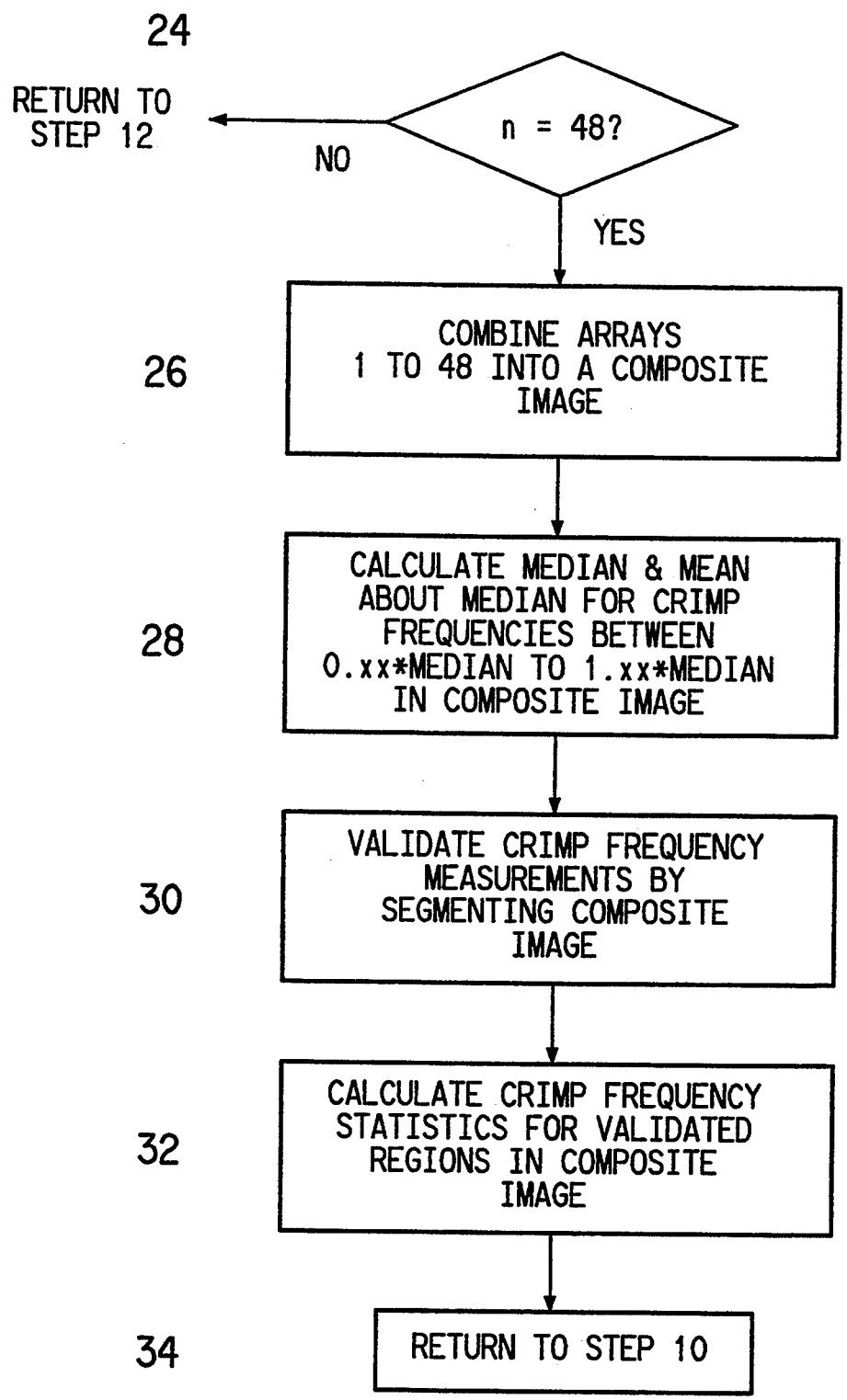

The preprocessing algorithm is illustrated by FIGS. 3a and 3b. In step 10 of FIG. 3a the video image of a portion of light shadowed fibrous material in the form of a tow or "rope" band is digitized and stored in the memory of the computer. Typically ten sequential horizontal lines (of the 480) in the video image are averaged pixel by pixel to form a single data array of 512 values of average light intensity in step 12. Next, in step 14 a threshold level (Tc) is calculated by summing the intensities of the minima and of the maxima and subtracting these two sums. The result is divided by the number of maxima (or minima), the resulting quotient is an average of the reflected light intensity difference. Dividing this quotient by an arbitrary constant k normalizes the threshold value so that it may be expressed as a fraction of the average intensity difference.

$$Tc = [Sum\ I(max) - Sum\ I(min)] / [n(max) * k]$$

This threshold level calculation is done for the pixel averaged data array acquired in step 12. Alternatively a minimum or a constant value of Tc may be programmed into the software.

The frequency and location of each crimp oscillation is found by searching the 512 values in a single pixel averaged data array and determining local maxima and minima which fit requirements based on the threshold value (Tc). Two loop type algorithms as expressed below are used in step 16. Note that these algorithms also allow a minimum number of pixels (kp) to be specified between adjacent maxima and minima.

Loop:
   Max=0
   If I(x)>Max then Max=I(x):N=0
   N=N+1: x=x+1
   If N>kp and (Max-I(x))>Threshold then Max found Min=Max
   If I(x)<Min then Min=I(x):N=0
   N=N+1: x=x+1
   If N>kp and (I(x)-min)>Threshold then Min found
Loop while x<512

In step 18 the wavelength of the crimp, defined to be the distance D (in units of length) between adjacent maxima in reflected light intensity as illustrated in FIG. 1a is calculated. The frequency of crimp can also be determined from the wavelength as the reciprocal or (1/D). Wavelength D is calculated for each crimp oscillation in a pixel averaged data array. Wavelength (or frequency) and location of each crimp cycle is stored in a file in step 20 from which crimp statistics may be generated.

The current pixel averaged array index (n) is incremented by one in step 22 and then tested in step 24. Since there are 480 horizontal video lines, 48 arrays of ten horizontal lines will be averaged to create a single composite image of the light shadowed rope band. When the array index (n) is equal to 48, the arrays are composited and stored in computer memory in step 26. Crimp statistics are then calculated for the composite image.

It is usual to find 5 to 40 crimp oscillations in a horizontal line depending upon crimp frequency, quality of the web material and field of view determined by the camera optics. Preliminary oscillation statistics calculated are: mean, median, standard deviation. The mean-about-median, the average of all frequencies between kl*median and kh*median, is calculated in step 28 for the composite image. The mean-about-median calculation assumes that the median is fairly close to the actual crimp frequency and that valid crimp oscillations will not have frequencies dramatically different from the median. Thus, any region with oscillation frequencies much higher or much lower than the median would be the result of either a defect in the crimping or a defect in the quality of the image. The average crimp frequency in the limited range about the median is taken as a more accurate estimate of the base crimp level produced by the primary crimper setting. The value of kl, the low frequency limit, is taken as a number <1.0 but generally >0.5, such as 0.75. The value of kh, the high frequency limit, is taken as >1.0, but generally <2.0, such as 1.5. Choosing kh <2.0 prevents certain crimp defects being reported as valid crimp. Values of kl and kh are optionally set by web product type.

For the reasons stated above the composite image is segmented in step 30 in the following way. Regions of the image containing crimp frequency values >kl*median and <kh*median are said to be "valid crimp" regions. Regions containing frequency values <kl*median are "abnormal" due to, for instance, low frequency crimp defects and poor image contrast. Regions containing frequency values >kh*median are "abnormal" due to, for instance, high frequency crimp defects and image noise. These segmented regions may all be designated on the composite image. The regions outside the median threshold limits set by kl and kh can be reevaluated to determine if they are related to known crimping defects. If such a relation is found, the presence of the defect can be reported.

The algorithm above is typically applied to ten horizontal lines of the composite image in step 30. Typically there are 48 groups of ten horizontal video lines in the composite image. These calculations are then made on evenly spaced rows determined from the 480 horizontal line image. The data obtained are stored in the computer as a function of location in the image of the web material. A further refinement takes into account that individual crimps are expected to be adjacent to one or more other crimp oscillations of similar wavelength. Thus, the algorithm can look at the different identified crimps on a location map and apply an "adjacency test". This test determines if the crimp is adjacent to a selected number of oscillations of the same type. If a crimp oscillation passes the test, the frequency found is classified as "confirmed". If a particular oscillation fails the adjacency test, it is reclassified as "unconfirmed".

Figure 4A:
FIG. 4a is an enlarged photograph of a raw image of the webbing measured.
Figure 4B:
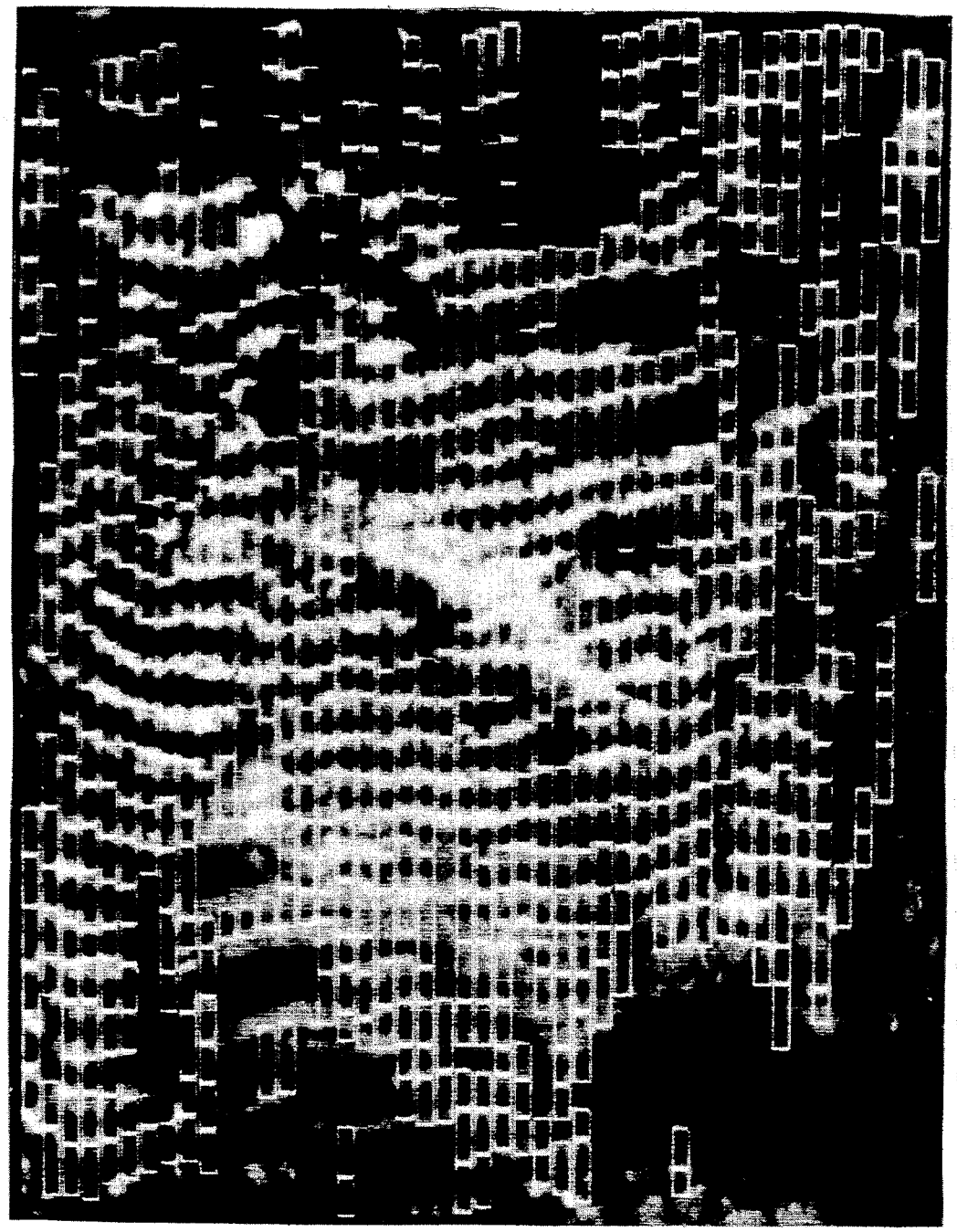
FIG. 4b is reproduction of FIG. 4a outlining areas of base crimp.
Figure 4D:
FIG. 4d is an enlarged photograph outlining areas classified as high frequency oscillations.
Figure 4E:
FIG. 4e is a reproduction of FIG. 4a illustrating edge oscillations of the web.
Figure 4C:
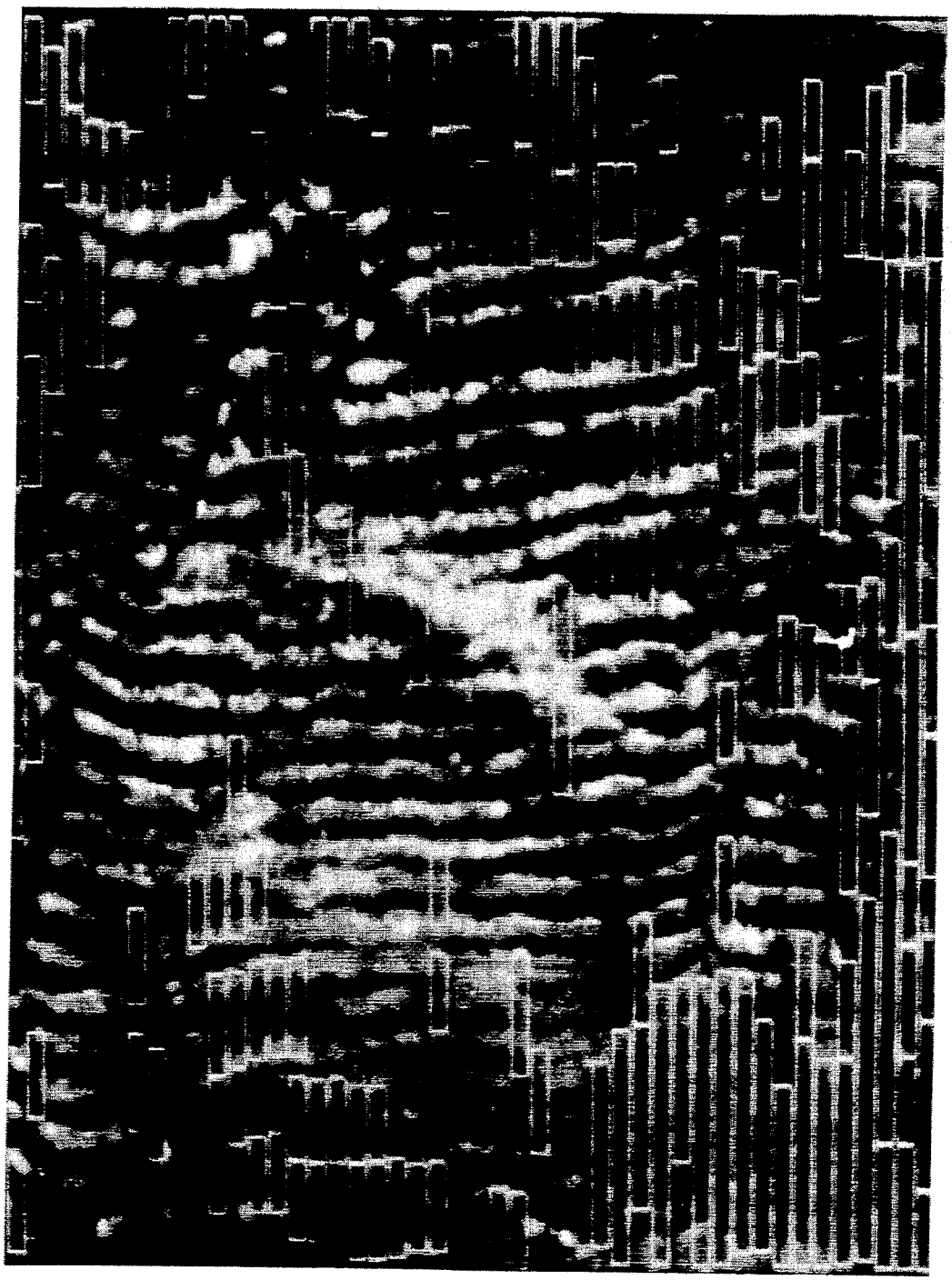
FIG. 4c is a reproduction of FIG. 4a outlining areas classified as low frequency oscillations.
Figure 4F:
FIG. 4f is a reproduction of FIG. 4a illustrating unconfirmed oscillations.

In step 32 crimp frequency statistics are assembled for the validated regions of the composite image. The composite image is displayed in the formats illustrated in FIG. 4. In FIG. 4a the raw image is shown. In 4b the areas of valid crimp are outlined in rectangular boxes, the height of each rectangular box is ten horizontal video lines and the length is equivalent to a crimp cycle. In FIG. 4c regions of low frequency oscillations are shown, the width of each rectangular box falls outside the low frequency limits for valid crimp. In FIG. 4d regions of high frequency oscillations falling outside the limits for a valid region are highlighted. In FIG. 4e rejected edge regions are illustrated, a certain portion of every composite image is eliminated due to crimp cycles extending outside the instantaneous field of view. In FIG. 4f oscillations are shown which meet the frequency requirements to be classified as valid crimp or as high frequency oscillations, but these oscillations failed to be confirmed by the adjacency test.

In addition to crimp frequency the following measurements or control functions are applied in real time to the moving rope band exiting the process.
  a) crimp frequency measurements for the complete width of the web material;
  b) locations in two dimensional coordinates of normal and abnormal crimp regions;
  c) abnormal crimp frequency measurements excluded automatically from statistics on the normal crimp regions;
  d) automatic optimization of crimp measurement algorithms for illumination and reflectivity variation and crimp amplitude;
  e) detection of crimp abnormalities and their locations;

While the preferred has been illustrated with a moving web, it is to be understood that this invention can be used with the web stationary with respect to the camera. In this case the strobe light used for stopping the apparent motion of the web is not needed.

What is claimed is:

1. An inspection system for characterizing inherent crimp features in a moving web of crimped fibrous material comprising:

a) stepping motor controller controlling the movement of a stroboscopic light source relative to said moving web, and using the emission Of light from said stroboscopic light source to create an apparent stop-motion view of said web;

b) a video camera capable of capturing variations in reflected light intensity from said web and a video frame grabber for performing analog to digital conversion, all connected to a digital computer capable of storing two-dimensional digitized images of at least a portion of said moving web in realtime;

c) means for measuring and storing the locations and the frequencies of spatial variations in the intensity of the reflected light two-dimensional image of said web;

d) means for classifying said stored locations and frequencies of spatial variations in the intensity of the reflected light two-dimensional image into categories of base crimp, low frequency oscillations, high frequency oscillations, edge oscillations and unconfirmed oscillations;

e) means for processing sequentially said stored locations and frequencies of spatial variations in intensity of reflected light two-dimensional image to segment the full width of the web into categories of base crimp, low frequency oscillations, high frequency oscillations, edge oscillations and unconfirmed oscillations;

f) means for locating said base crimp, low frequency oscillations, high frequency oscillations, edge oscillations and unconfirmed oscillations in realtime with respect to the moving web; and g) means for displaying said base crimp, low frequency oscillations, high frequency oscillations, edge oscillations and unconfirmed oscillations with respect to the moving web.

2. A digital computer based method for characterizing crimp features in a moving web of crimped fibrous material comprising:

a) using a stepping motor controller ti control the movement of a stroboscopic light source relative to said moving web, and using the emission of light from said stroboscopic light source to create an apparent stop-motion view of said web;

b) programming and operating a digital computer to determine electronic data representative of a two-dimensional reflected light image of said moving web captured with a video camera, and a video frame grabber for analog to digital conversion, all connected to said digital computer capable of storing two-dimensional digitized images of at least a portion of said moving web in realtime;

c) measuring and storing the locations and the frequencies of spatial variations in reflected light intensity in said electronic data representative of said two-dimensional reflected light image by means of electronic processing;

d) classifying by means of electronic processing said stored locations and frequencies of spatial variation in reflected light intensity into categories of base crimp, low frequency oscillations, high frequency oscillations, edge oscillations and unconfirmed oscillations;

e) processing sequentially by means of electronic processing electronic data representative of said two-dimensional images of said moving web to segment the full width of the web into said categories of base crimp, low frequency oscillations, high frequency oscillations, edge oscillations and unconfirmed oscillations;

f) displaying by means of electronic processing the categories of spatial frequency of reflected light intensity to derive electronic data representative of each two-dimensional image obtained and stored by means of electronic processing and by further means of electronic processing, locating said base crimp, low frequency oscillations, high frequency oscillations, edge oscillations and unconfirmed oscillations in real time within said electronic data representative of each two-dimensional image correlated with the moving web of crimped fibrous material.

* * * * *